United States Patent Office 3,259,367
Patented July 5, 1966

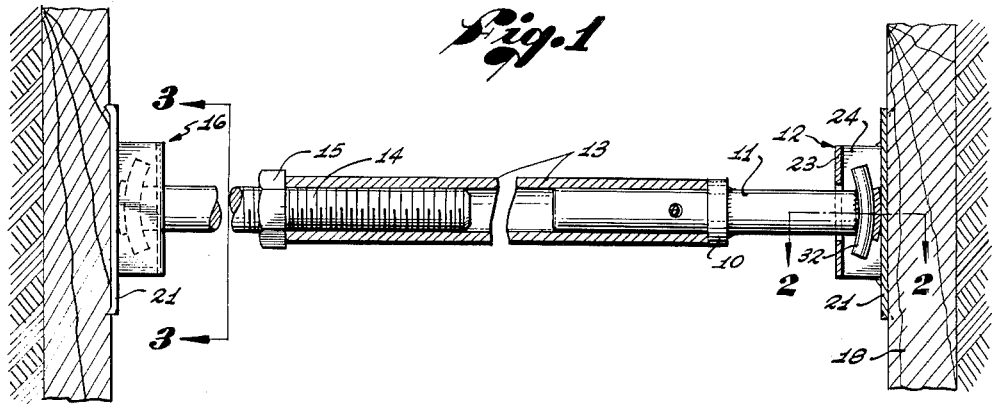
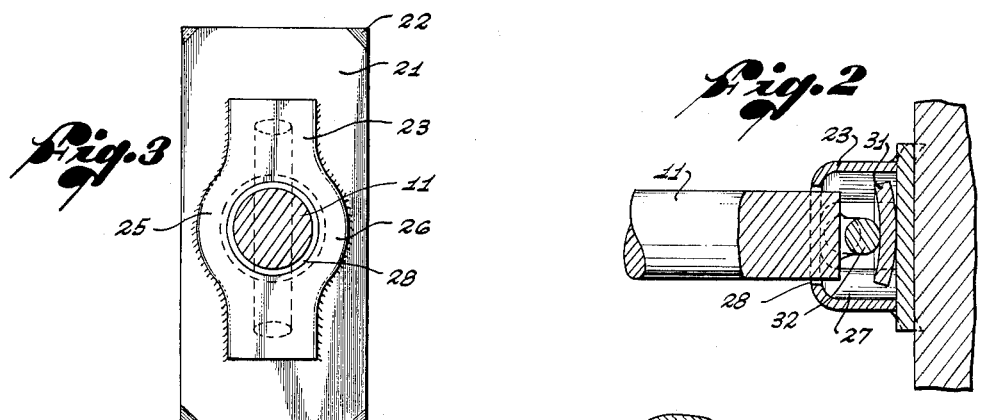
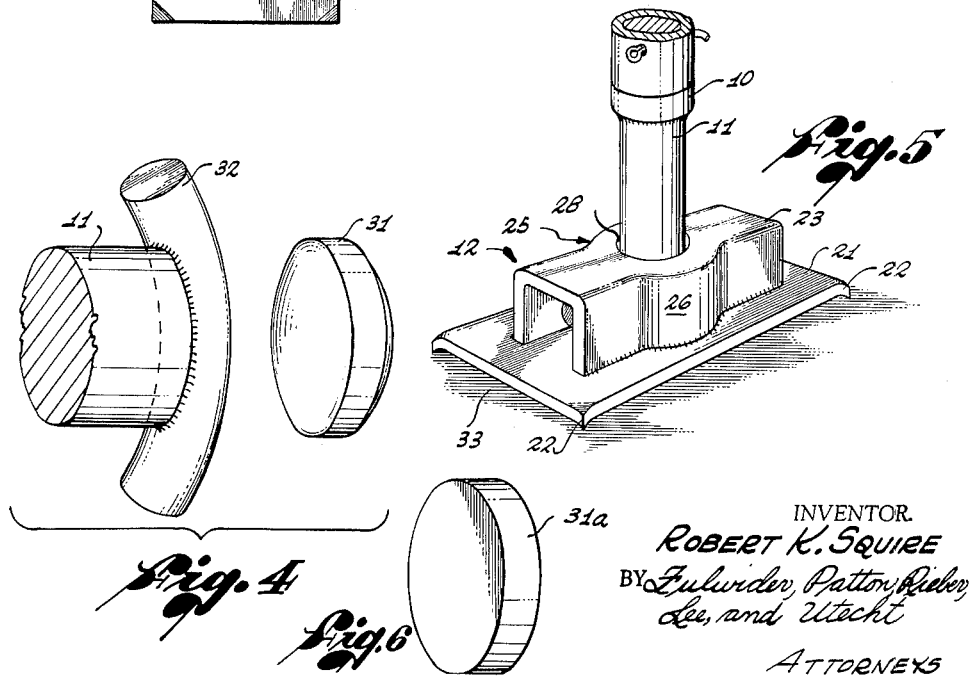

3,259,367
SHORING JACK
Robert K. Squire, Los Angeles, Calif., assignor to Superior Scaffold Co., Torrance, Calif., a corporation of California
Filed Jan. 13, 1964, Ser. No. 337,379
14 Claims. (Cl. 254—101)

The present invention relates generally to supporting jacks used as shores or braces and more particularly to an improved shoring jack having a supporting foot or bearing shoe incorporating an improved universal joint.

Shoring jacks for both horizontal and vertical bracing are conventionally provided with supporting feet or bearing shoes which include ball and socket joints to give limited relative tilting movement between the load supporting axis of the jack and the plane of the supporting foot to accommodate normal variations from the perpendicular between the direction of application of the load and a supporting surface against which the jack foot is mounted. Such ball and socket universal joints may be provided at both ends of the shoring jack, particularly where used to provide horizontal bracing to shoring timbers in a trench or ditch earth excavation. In vertical bracing the shoring jack may be provided with a universal joint foot at only the bottom end or may again desirably be provided with universal joints at both the bottom and top ends to accommodate variations from the horizontal in both the supporting and supported surfaces.

The ball and socket universal joints of conventional shoring jack feet are critical points of failure for the jack from the standpoints of both strength and durability, and are also relatively expensive to construct with acceptable accuracy of the mating surfaces. It is a general object of the present invention to provide a shoring jack with a supporting foot having an improved limited universal joint of relatively inexpensive construction and increased strength and durability.

Another object of this invention is the provision of an improved shoring jack having a supporting foot with a limited universal joint thereto constructed of inexpensive sheet metal parts.

A further object of this invention is the provision of an improved shoring jack having a supporting foot connected thereto by a limited universal joint of permanent and fool-proof construction.

These and other objects and features of the invention will be readily apparent to those skilled in the art from the following specification and the appended drawing, in which:

FIGURE 1 is a side view, partly in elevation and partly in section, of a shoring jack according to the present invention used as a transverse brace in an earth trench;

FIGURE 2 is an enlarged sectional view on the line 2—2 of FIGURE 1;

FIGURE 3 is an enlarged sectional view on the line 3—3 of FIGURE 1;

FIGURE 4 is an enlarged, expanded perspective view of elements of the universal joint provided in the supporting foot connection;

FIGURE 5 is a perspective view of a bottom supporting foot and shoring jack according to the present invention used as a vertical brace; and FIGURE 6 is a perspective view of a modified floating, load-transmitting element.

The embodiment of the shoring jack according to the present invention illustrated in FIGURE 1 employs a cylindrical rod or arm 11 upon one end of which is secured a supporting foot 12. The opposite end of the supporting rod 11 is received within a tubular body member 13 with a slip fit, the tubular member 13 abutting against a collar 10 welded on the rod 11. The end of the body member 13 opposite the supporting rod 11 receives the end of a jack screw 14 in free sliding and telescoping relation. A nut 15 is adjustable on the jack screw 14 to limit its movement interiorly of the tubular body member 13. Upon the remote end of the jack screw 14 is mounted a supporting foot 16 similar to the foot 12 and in accordance with the present invention. As illustrated in FIGURE 1, the shoring jack is used to provide transverse, lateral support to wood shoring members 17 and 18 which retain the side walls of a trench-like earth excavation in which the shoring jack is disposed.

The shoring jack supporting feet 12 and 16 include sheet steel or other metal back plates 21 which are disposed generally at right angles to the load supporting axis of the jack but have limited universal tilting movement relative thereto. Sharpened, backwardly bent corner prongs 22 may be provided on each plate 21, to be forced into a supported or supporting member, such as the wood shoring members 17 and 18, to hold the plates 21 in position against involuntary slippage.

On the front face of the back plate 21 is intergrally secured, as by welding or brazing, an elongated, sheet metal enclosing member 23 which is substantially U-shaped in cross section and which cooperates with the back plate 21 to form an elongated chamber 24. The central portion of the member 23 bulges outwardly at its opposite sides 25 and 26 to form a central, generally circular chamber 27 into which there is provided a front opening 28 extending through the bight of the member 23, generally centrally thereof.

A concavo-convex sheet steel disc 31 is mounted in the central circular chamber 27, in free floating relation, with its convex surface facing to engage the front face of the plate 21. The jack rod 11 extends through the opening 28 into the chamber 27 and has mounted on its end, as by brazing or welding, a rocker 32 desirably in the form of a curved rod which has an outside radius of curvature substantially equal to the radius of the concave surface of the disc 31 so that it nests concentrically therein, as shown in FIGURE 1. The ends of the rocker 32 desirably extend beyond the chamber 27 into the end portions of the chamber 24 to limit the relative rotation between the jack rod and jack screw and their supporting feet.

The operation and function of the shoring jack supporting foot according to the present invention will be readily apparent. The relative tilting between the supporting plates 21 and the respective jack rod or jack screw is limited by the edges defining the opening 28 and the engagement of the jack element therewith. In this universal tilting movement, the convex surface of the disc 31 is free to roll in all directions with respect to the front face of the supporting plate 21. In addition, the rocker 22 can roll sidewise with respect to the concave surface of the disc 31 but not endwise with respect thereto. However, in normal support, all necessary tilting motions of the jack rod and jack screw relative to their supporting plates 21 can be taken care of by the universal rolling of the convex surface of the disc 31 on the front face of the supporting plate.

The disc 31 is free to rotate about its transverse axis so as to vary in a random manner the surface of the disc which rolls over each portion of the surface of the supporting plate 21 to effect uniformity of wearing action.

In assembling the supporting foot to the jack rod or the jack screw, a free enclosure member 23 may be slipped over the end of the jack element which thereby extends through the opening 28 in the relation shown in the drawings. Thereafter, the rocker rod 32 may be brazed or welded on the end of the jack element, the disc 31 associated with the rocker, and the supporting plate 21 and enclosing member 23 brought together and brazed or welded to permanently secure the parts together as shown in the drawings.

It will be noted that the supporting plate 21, the enclosing member 23 and the free-floating disc 31 are all of sheet metal such as steel and are readily formed by suitable shearing, bending and piercing operations. The rocker rod 32 is also a simple part formed by cutting and bending. The construction of the shoring jack's supporting foot and its mounting on the jack elements are therefore of simple, reliable and inexpensive construction. If desired, the rolling faces of the disc 31 and supporting plate 21, that is, the convex surface of the disc and the front face of the plate, may be hardened by any known technique to improve the durability and integrity of the surfaces and to insure their proper rolling cooperation.

The enclosing member 23 increases the strength of the supporting plate 21 and after it is secured to the supporting plate, the parts will be maintained permanently assembled with the disc 31 free-floating within the circular chamber 27, and from which it cannot be removed because its diameter is greater than the width of the chamber 24 at its opposite ends. The foot cannot be removed from the jack element since the rocker 32 is longer than the diameter of the opening 28 and the foot cannot turn relative to the jack element except through a limited arc, since the ends of the rocker rod 32 are disposed in the opposite ends of the chamber 24. The construction, therefore, provides for a strong, durable and permanent connection between the supporting foot and the jack element having universal tilting movement limited by the spacing between the jack element and the edges defining the opening 28 through the enclosing member 23.

FIGURE 5 illustrates the operation of a shoring jack in a vertical load-supporting position with a bottom supporting foot 12 engaging a horizontal supporting surface, such as a floor 33. The top of the vertical shoring jack may include a top supporting foot, such as shown at 16 in FIGURE 1, or may be otherwise secured to a supported member.

FIGURE 6 shows a modified floating load transmitting element 31a in the form of a flat plate which may be substituted for the element 31. In this case the relative tilting movement is effected by the rocker 22 rolling over the surface of the plate element 31a which it engages.

It is therefore seen that the shoring jack according to the present invention includes a supporting foot having limited universal tilting movement with respect to the load-supporting axis of the jack, in which the connection between the supporting foot and the jack is provided without cast or machined parts. The joint utilizes sheet and rod metal parts shaped by simple forming operations and secured together in a substantially permanent fashion to be strong, durable and relatively inexpensive.

While a certain preferred embodiment of the invention has been specifically illustrated and described, it will be understood that the invention is not limited thereto as many variations will be apparent to those skilled in the art and the invention is to be given its broadest interpretation within the terms of the following claims.

I claim:

1. A shoring jack comprising: a load-supporting member; a supporting plate for said member; a free-floating element disposed between said member and said plate to transmit the load from said member to said plate; and means for loosely holding said supporting plate and element on said member for limited universal tilting movement of the plate relative to the axis of the member with a rolling action in all directions transversely of the axis of the member.

2. A shoring jack comprising: a load-supporting member; a supporting plate for said member having a substantially flat forward surface; a concavo-convex disc mounted between said supporting plate and said member with its convex surface in engagement with the front face of said member for universal rolling movement thereover; means on the end of said load-supporting member having a convex curvature substantially the same as the curvature of the concave surface of said disc and nesting therein; and an enclosing member rigidly secured to the front face of said supporting plate and forming a chamber therewith loosely receiving said disc and the end of the load-supporting member so that the disc is free-floating within the chamber.

3. A shoring jack comprising: a load-supporting member; a supporting plate for said member having a substantially flat forward surface; a concavo-convex disc mounted between said supporting plate and said member with its convex surface in engagement with the front face of said member for universal rolling movement thereover; a curved rocker rod rigidly mounted on the end of said load-supporting member and having the curvature of its convex edge substantially the same as the curvature of the concave surface of said disc and nesting therein; an enclosing member rigidly secured to the front face of said supporting plate and forming a chamber therewith loosely receiving said rocker rod and disc so that the disc is free-floating within the chamber; and means defining an opening through said enclosing member for passage of the load-supporting member therethrough, said last-mentioned means limiting the relative tilting movement between the supporting plate and jack member.

4. The shoring jack defined in claim 2 in which said enclosing member is of elongated form, U-shaped in cross-section, with the ends of its legs rigidly secured to the supporting plate.

5. The shoring jack defined in claim 4 in which the opposite sides of said enclosing member bulge outwardly intermediate the ends thereof to form a substantially circular intermediate chamber in which said disc is loosely mounted for free-floating and rotational movement.

6. The jack defined in claim 3 in which said rocker rod is of a length to engage the walls of the enclosing member to limit the relative rotational movement about the loading axis between the supporting plate and the load-supporting member.

7. A shoring jack comprising: a load-supporting jack member; a supporting plate for one end of said jack member; a floating member intermediate said jack member and said supporting plate and having a convex surface engaging the front face of said supporting plate in universal rolling rotation; means on the end of said jack member engaging said floating member in abutting relation; and means holding said floating member and the means on the end of the jack member in loose, load-supporting relation with said supporting plate so that said floating member is free to roll under load to effect tilting of the jack member relative to the supporting plate.

8. A shoring jack comprising: a load-supporting jack member; a supporting plate for one end of said jack member; a floating member intermediate said jack member and said supporting plate and having a convex surface engaging the front face of said supporting plate in universal rolling relation; means on the end of said jack member engaging said floating member in abutting relation; and means holding said floating member and the means on the end of the jack rod in loose, load-supporting relation with said supporting plate so that said floating member is free to roll under load to effect tilting of the jack member relative to the supporting plate, said floating member and jack member end means being free to separate from each other and the supporting plate when unloaded to permit free rotation of the floating member about a transverse axis into different surface engagements with the supporting plate.

9. A shoring jack comprising: a load-supporting jack member; a supporting plate for one end of said jack member; a floating member intermediate said jack member and said supporting plate and having a convex surface engaging the front face of said supporting plate in universal rolling relation; means on the end of said jack member engaging said floating member in abutting relation; and enclosing means holding said floating member and the means on the end of the jack member in loose, load-supporting relation with said supporting plate so that said floating member is free to roll under load to effect tilting of the jack member relative to the supporting plate, said enclosing means being rigidly secured to the supporting plate and engaging the jack member and the means on the end thereof to limit relative tilting and rotational movements between the jack member and the supporting plate.

10. A shoring jack as defined in claim 7 in which said supporting plate and floating member are formed of sheet metal and said floating member is a concavo-convex disc.

11. A shoring jack as defined in claim 9 in which said supporting plate, floating member and enclosing means are formed of sheet metal and said means on the end of the jack member is a curved length of metal rod.

12. A shoring jack comprising: a load-supporting member; a supporting plate for said member having a substantially flat forward surface; a flat load transmitting element disposed between said plate and the end of said member; a rocker on the end of said member and engaging the forward face of the element for tilting movement of the member relative to the element and plate by rolling action of the rocker on the face of the element in all directions transversely of the axis of the member; and an enclosing member rigidly secured to the front face of said supporting plate and forming a chamber therewith loosely receiving said element and the end of said member so that the element is free-floating within the chamber.

13. A shoring jack as defined in claim 1 in which said free floating element is free to rotate about an axis aligned with the axis of said member in random fashion so as to promote uniformity of wearing action.

14. A shoring jack as defined in claim 12 in which said load transmitting element is free to rotate about an axis aligned with the axis of said member in random fashion so as to promote uniformity of wear on the forward face of said element.

References Cited by the Examiner

UNITED STATES PATENTS 891,897   6/1908   Astrom  ----------- 254—101

WILLIAM FELDMAN, *Primary Examiner.*

OTHELL M. SIMPSON, *Examiner.*